(12) United States Patent
Hsu et al.

(10) Patent No.: US 10,960,592 B2
(45) Date of Patent: Mar. 30, 2021

(54) COMPUTER-IMPLEMENTED SIMULATION METHOD FOR INJECTION-MOLDING PROCESS

(71) Applicant: CORETECH SYSTEM CO., LTD., Chupei (TW)

(72) Inventors: Chih-Chung Hsu, Chupei (TW); You-Sheng Zhou, Chupei (TW); Chia-Hsiang Hsu, Chupei (TW); Rong-Yeu Chang, Chupei (TW)

(73) Assignee: Coretech System Co., Ltd., Hsinchu (TW)

( * ) Notice: Subject to any disclaimer, the term of this patent is extended or adjusted under 35 U.S.C. 154(b) by 0 days.

(21) Appl. No.: 16/587,858

(22) Filed: Sep. 30, 2019

(65) Prior Publication Data

US 2020/0376733 A1 Dec. 3, 2020

Related U.S. Application Data

(60) Provisional application No. 62/854,800, filed on May 30, 2019.

(51) Int. Cl.
| | |
|---|---|
| *B29C 45/76* | (2006.01) |
| *B29C 45/80* | (2006.01) |
| *B29C 45/77* | (2006.01) |
| *B29C 45/78* | (2006.01) |
| *G06F 30/23* | (2020.01) |
| *G06F 113/22* | (2020.01) |

(52) U.S. Cl.
CPC ...... *B29C 45/7693* (2013.01); *B29C 45/7646* (2013.01); *B29C 45/77* (2013.01); *B29C 45/78* (2013.01); *B29C 45/80* (2013.01); *G06F 30/23* (2020.01); *B29C 2945/76498* (2013.01); *B29C 2945/76531* (2013.01); *B29C 2945/76538* (2013.01); *B29C 2945/76545* (2013.01); *B29C 2945/76595* (2013.01); *B29C 2945/76612* (2013.01); *B29C 2945/76665* (2013.01); *G06F 2113/22* (2020.01)

(58) Field of Classification Search
None
See application file for complete search history.

(56) References Cited

U.S. PATENT DOCUMENTS

| | | | |
|---|---|---|---|
| 9,555,571 B1* | 1/2017 | Chang | B29C 33/3835 |
| 2017/0015040 A1* | 1/2017 | Chang | G05B 17/02 |

FOREIGN PATENT DOCUMENTS

WO WO-2019/11316 A1 6/2019

* cited by examiner

*Primary Examiner* — Monica A Huson
(74) *Attorney, Agent, or Firm* — Muncy, Geissler, Olds & Lowe, P.C.

(57) ABSTRACT

A computer-implemented simulation method for use in a molding process by a computer process is disclosed. The method includes steps of specifying a simulating domain comprising a mold cavity and a barrel of an injection machine, wherein the barrel is configured to connect to the mold cavity; creating at least one mesh by dividing at least part of the simulating domain; specifying boundary conditions of the mesh by taking into consideration at least one motion of a screw in the barrel; and simulating a first injection-molding process of a molding material by using the boundary conditions to generate a plurality of molding conditions.

9 Claims, 19 Drawing Sheets

COMPUTER-IMPLEMENTED SIMULATION METHOD FOR INJECTION-MOLDING PROCESS

PRIORITY CLAIM AND CROSS-REFERENCE

This application claims the priority benefit of U.S. provisional application Ser. No. 62/854,800, filed on May 30, 2019. The entirety of the above-mentioned patent application is hereby incorporated by reference herein and made a part of this specification.

TECHNICAL FIELD

The present disclosure relates to a computer-implemented simulation method for an injection-molding process.

DISCUSSION OF THE BACKGROUND

Injection molding is an important industrial process for producing large quantities of complex plastic parts. New polymers and the demand for high-quality electronics, consumer products, automobiles and aircraft have forced engineers and designs to improve mold-tooling efficiency and the quality of final parts.

In general, the setting of molding conditions in an injection-molding machine requires a large number of trial molding operations and a lengthy setup time. The analytical data generated by a virtual molding process using computer-implemented simulation is based on idealistic cases that do not take into account properties of actual injection-molding machines or molding materials during molding processes. Consequently, the setup processes of an actual injection-molding machine depend greatly on the know-how and experience of on-site technicians.

Specifically, in a trial run of an injection-molding process, the on-site technicians must continuously monitor the actual injection-molding machine and determine an optimal molded product through measuring or examining dimensions, weight and warpage of molded products obtained in the trial run. The molding conditions of the optimal molded product are adapted as a standard state. In other words, the molding conditions of the optimal injection-molded product are implemented by repetitive trial and error, which requires much time and labor. Consequently, an efficient analysis method is needed to replace the experimental trial-and-error process and to predict reality-compatible results of injection-molded products.

This Discussion of the Background section is provided for background information only. The statements in this Discussion of the Background are not an admission that the subject matter disclosed in this Discussion of the Background section constitute prior art to the present disclosure, and no part of this Discussion of the Background section may be used as an admission that any part of this application, including this Discussion of the Background section, constitutes prior art to the present disclosure.

SUMMARY

One aspect of the present disclosure provides a computer-implemented simulation method for use in a molding process by a computer process. The method includes steps of specifying a simulating domain comprising a mold cavity and a barrel of an injection machine, wherein the barrel is configured to connect to the mold cavity; creating at least one mesh by dividing at least part of the simulating domain; determining boundary conditions of the mesh by taking into consideration at least one motion of a screw in the barrel to process a molding material in the barrel; and simulating a first injection-molding process of the molding material using the boundary conditions to generate a plurality of molding conditions.

In some embodiments, the method further includes a step of calculating a melt front of the molding material based on the plurality of molding conditions.

In some embodiments, the method further includes a step of simulating at least one second injection-molding process of the molding material using the boundary conditions and the plurality of molding conditions.

In some embodiments, the plurality of molding conditions include a temperature distribution across the molding material, a pressure in the barrel, and a flow rate of the molding material.

In some embodiments, the boundary conditions of the mesh are determined using a set of lines to divide a screw movement zone in the barrel into a set of layers.

In some embodiments, the set of lines have a contour corresponding to a front surface of the screw.

In some embodiments, the set of lines are perpendicular to a movement direction of the screw.

In some embodiments, the mesh at least divides the screw movement zone into a set of elements and the layer includes elements.

In some embodiments, a density and a viscosity of the element partially occupied by the screw and partially filled with the molding material is described by an equation as shown below:

$$\rho_{mixed} = V_{screw} \cdot \rho_{screw} + V_{melt} \cdot \rho_{melt}; \text{ and}$$

$$\eta_{mixed} = V_{screw} \cdot \eta_{screw} + V_{melt} \cdot \eta_{melt},$$

where $\rho_{mixed}$ represents the density of the element, $\rho_{screw}$ represents the density of the screw in the element, $\rho_{melt}$ represents the density of the molding material in the element, $V_{screw}$ represents the volume of the screw in the element, $V_{melt}$ represents the volume of the molding material in the element, $\eta_{mixed}$ represents the viscosity in the element, $\eta_{screw}$ represents the viscosity of the screw in the element, and $\eta_{melt}$ represents the viscosity of the molding material in the element.

In some embodiments, an amount of the molding material injected into the mold cavity by the screw in the barrel is described by an equation as shown below:

$$\Sigma_{i=1-n} \rho_i^t \cdot V_i^t = \Sigma_{i=1-n} \rho_i^{t+dt} \cdot (V_i^{t+dt} + (u_b \cdot n_i ds_i) dt),$$

where $\rho^t$ and $\rho^{t+dt}$ represent the densities of the molding material at different injection times, $V^t$ and $V^{t+dt}$ represent the volumes of the molding material at different injection times, dt represents an increment of time, $u_b$ represents the speed of the screw, and $ds_i$ represents an area.

In some embodiments, the at least one motion of the screw is at least one linear motion of the screw in the barrel while the molding material is injected into the mold cavity.

In some embodiments, the at least one motion of the screw is used for determining a position of a front surface of the screw in the barrel.

The foregoing has outlined rather broadly the features and technical advantages of the present disclosure in order that the detailed description of the disclosure that follows may be better understood. Additional features and technical advantages of the disclosure are described hereinafter, and form the subject of the claims of the disclosure. It should be appreciated by those skilled in the art that the concepts and specific embodiments disclosed may be utilized as a basis for modifying or designing other structures, or processes, for carrying out the purposes of the present disclosure. It should also be realized by those skilled in the art that such equivalent constructions do not depart from the spirit or scope of the disclosure as set forth in the appended claims.

BRIEF DESCRIPTION OF THE DRAWINGS

A more complete understanding of the present disclosure may be derived by referring to the detailed description and claims. The disclosure should also be understood to be coupled to the figures' reference numbers, which refer to similar elements throughout the description.

DETAILED DESCRIPTION

Figure 1:
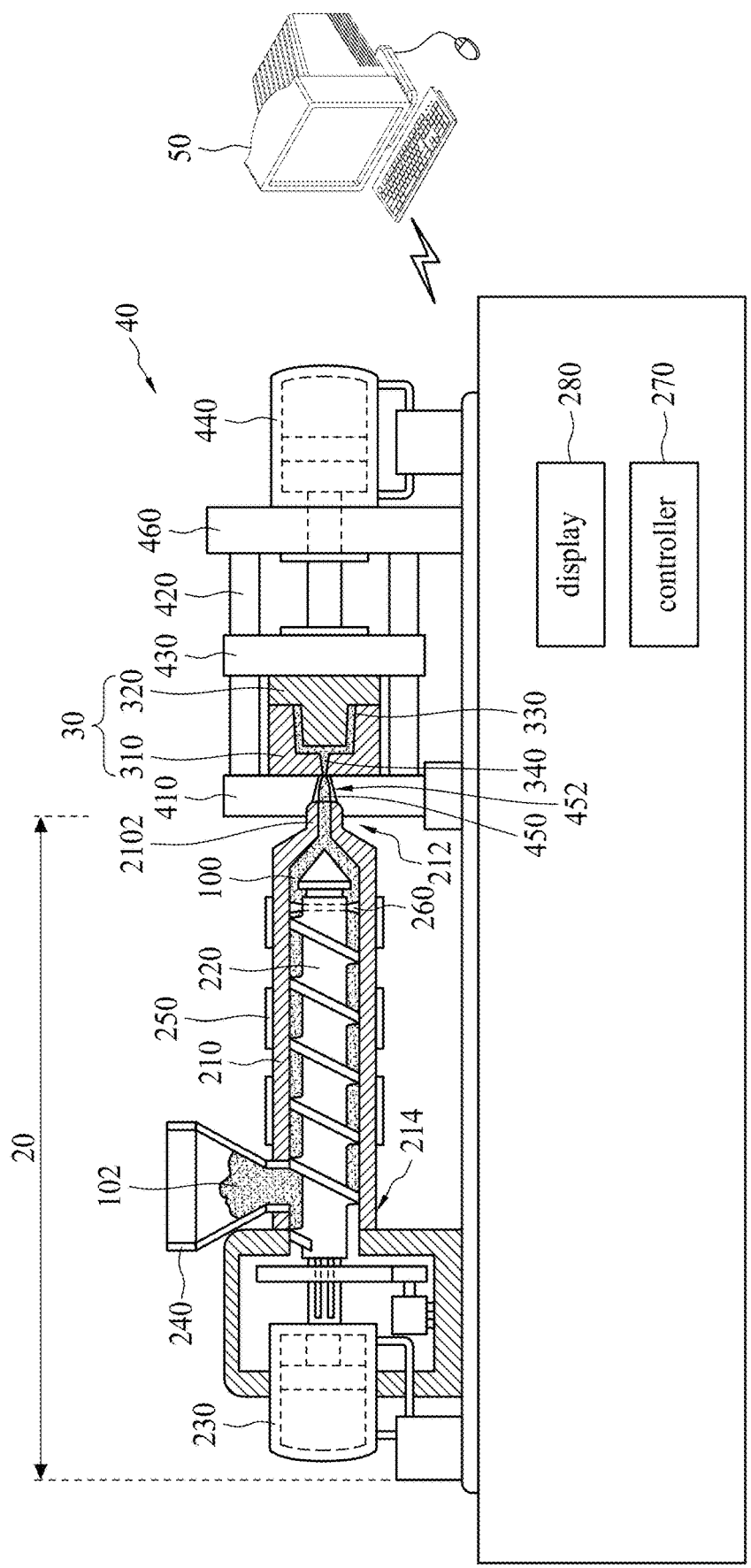
FIG. 1 is a schematic view of an injection-molding apparatus in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic view of an injection-molding apparatus 10 in accordance with some embodiments of the present disclosure. Referring to FIG. 1, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310,320. In some embodiments, the clamping assembly 40 includes a fixed plate 410, a plurality of tie bars 420 mounted on the fixed plate 410, and a moving plate 430 slidably engaged with the tie bars 420 and is guided by a driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bush 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on the tie bar 420. In some embodiments, the driving cylinder 440 penetrates the ejector plate 460 and directly connects to the moving plate 430 to open or close the mold 30. After the mold halves 310, 320 are parted (i.e., the mold 30 is opened), a distance between the moving plate 430 and the ejector plate 460 is reduced, so the ejector pin can penetrate through the ejector plate 460 to push a mold product out of the mold 30.

Mounted for motion within the barrel 210 is a screw 220 operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the plastic granules 102 change phase from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The molding machine 110 further includes a controller 270 for controlling and monitoring the real-time functions of the molding machine 20 and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control functions of the molding machine 20 by the on-site technicians particularly where the on-site technicians' intervention is required.

In some embodiments, the molding machine 20 can further include operation interface communication links among the controller 270, the display 280 and peripheral devices, and a program sequence of operation which renders the operation interface capable of monitoring diagnostic functions of the controller 270 and the molding machine 20, triggering sound/light alarms regarding conditions of the molding machine 20, receiving performance data from the molding machine 20, and receiving input data from the display 280.

The computer 50 is associated with the molding machine 20 and configured to execute a computer assisted engineering (CAE) simulation software and transmit at least one simulation result to the controller 270 through a connection such as a hard wire connection or a wireless coupling. In some embodiments, the computer 50 includes a standardized operation system capable of running general-purpose application software for assisting with the analysis of data process performance and for communicating with the controller 270 and the display 280 via communication ports thereof.

Figure 2:
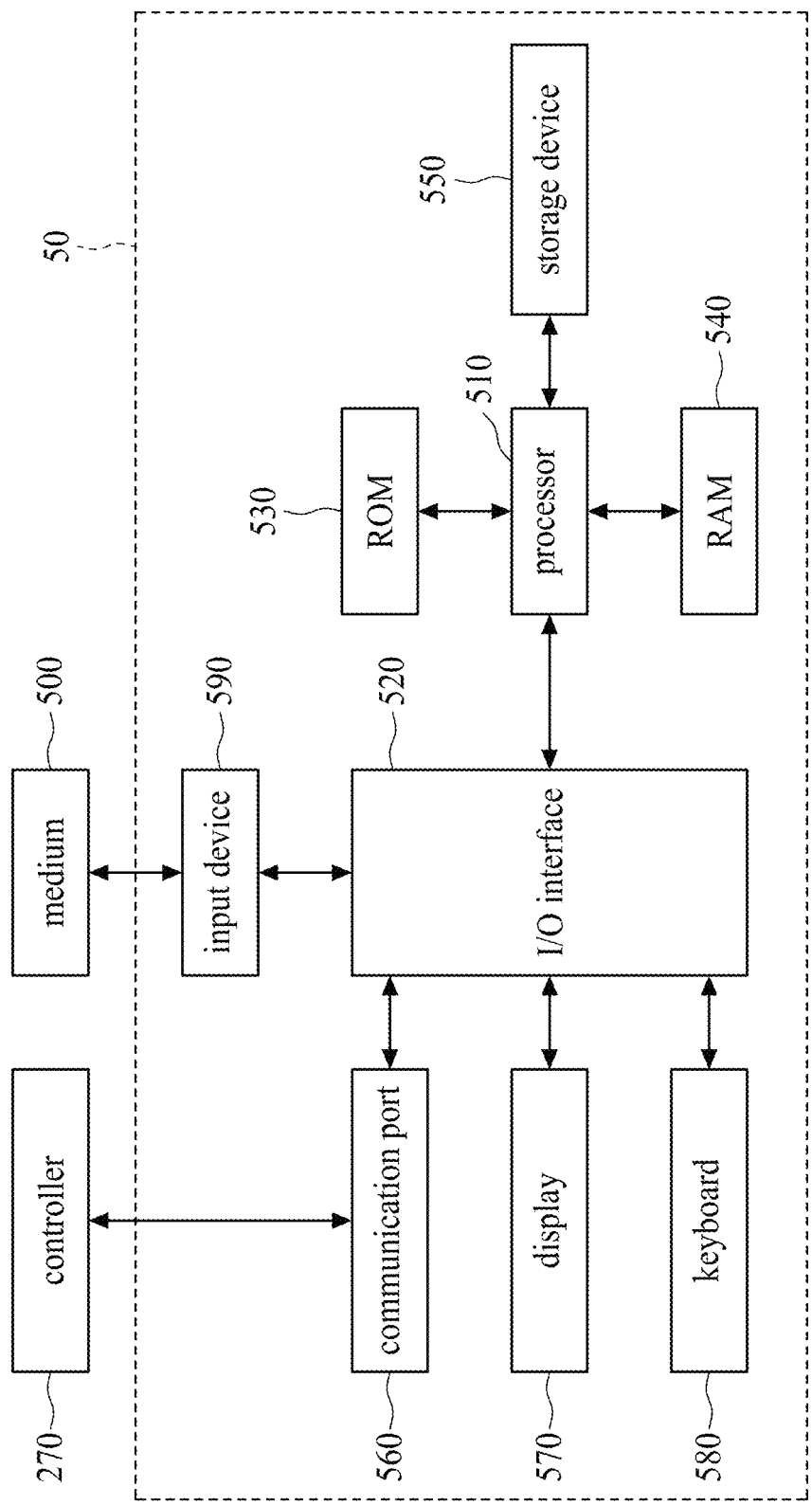
FIG. 2 is a functional block diagram of a computer in FIG. 1.

FIG. 2 is a functional block diagram of the computer 50 in FIG. 1. Referring to FIG. 2, the computer 50 includes a processor 510 adapted to perform a computer-implemented simulation method for use in injection-molding, an input/output (I/O) interface 520 electrically coupled to the processor 510, and memories, which may include a read-only memory (ROM) 530, a random access memory (RAM) 540 and a storage device 550. The ROM 530, the RAM 540 and the storage device 550 are communicatively coupled to the processor 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processor 510 is configured to execute operations for performing a computer-implemented injection-molding simulation method according to the computer instructions. In some embodiments, the processor 510 reads software algorithms from the other input device 590 or the storage device 550, executes the calculation steps, and stores the calculated result in the RAM 540.

Figure 3:
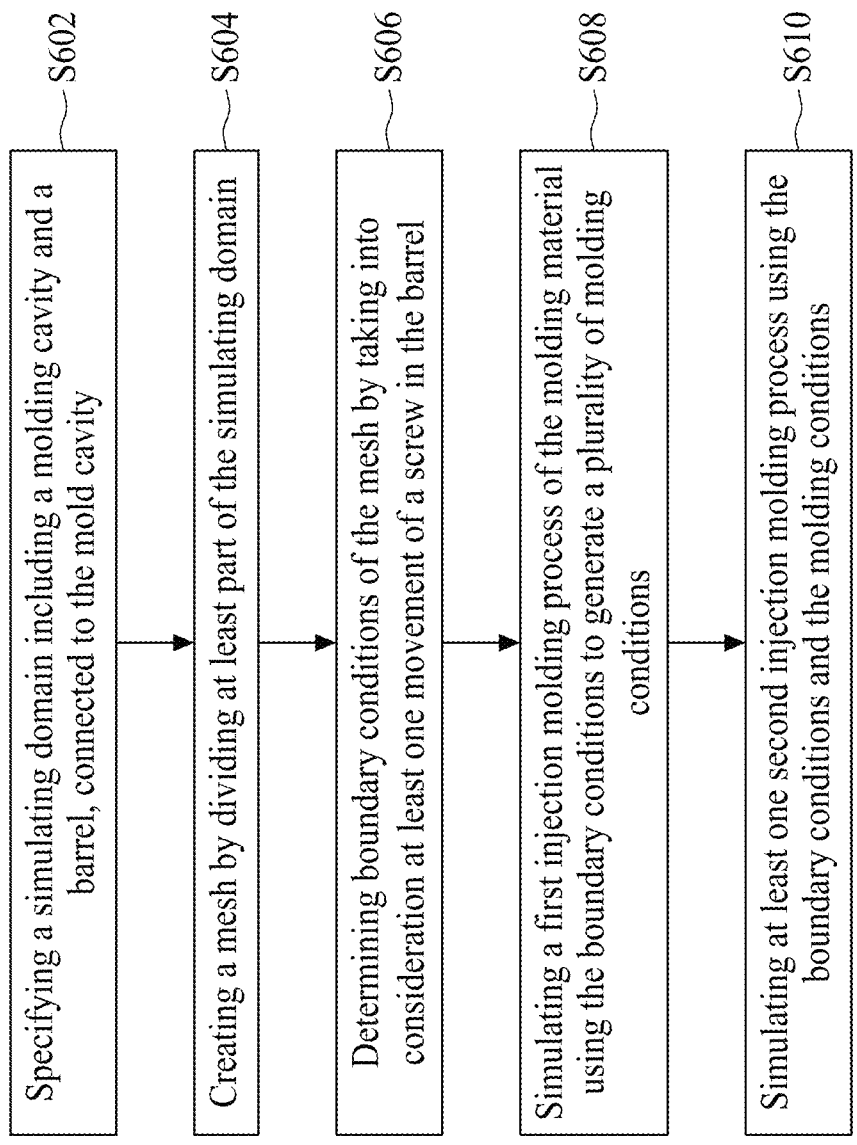
FIG. 3 is a flowchart of an injection-molding simulation method in accordance with some embodiments of the present disclosure.

FIG. 3 is a flowchart of an injection-molding simulation method 60 in accordance with some embodiments of the present disclosure. Referring to FIG. 3, the main step of the injection-molding simulation method 60 includes steps S602, S604, S606, S608 and S610. The method 60 may begin with step S602, in which a simulating domain at least including a mold cavity and a barrel of a molding machine are specified. At step S604, a mesh is created by dividing at least part of the simulating domain. At step S606, boundary conditions of the mesh are determined by taking into consideration at least one motion of a screw in the barrel. At step S608, a first injection-molding process of the molding material is simulated using the boundary conditions to generate a plurality of molding conditions. At step S610, at least one second injected molding process is simulated using the boundary conditions and the molding conditions.

The following describes an exemplary process flow of the injection-molding simulation method 60 in accordance with some embodiments of the present disclosure.

Figure 4:
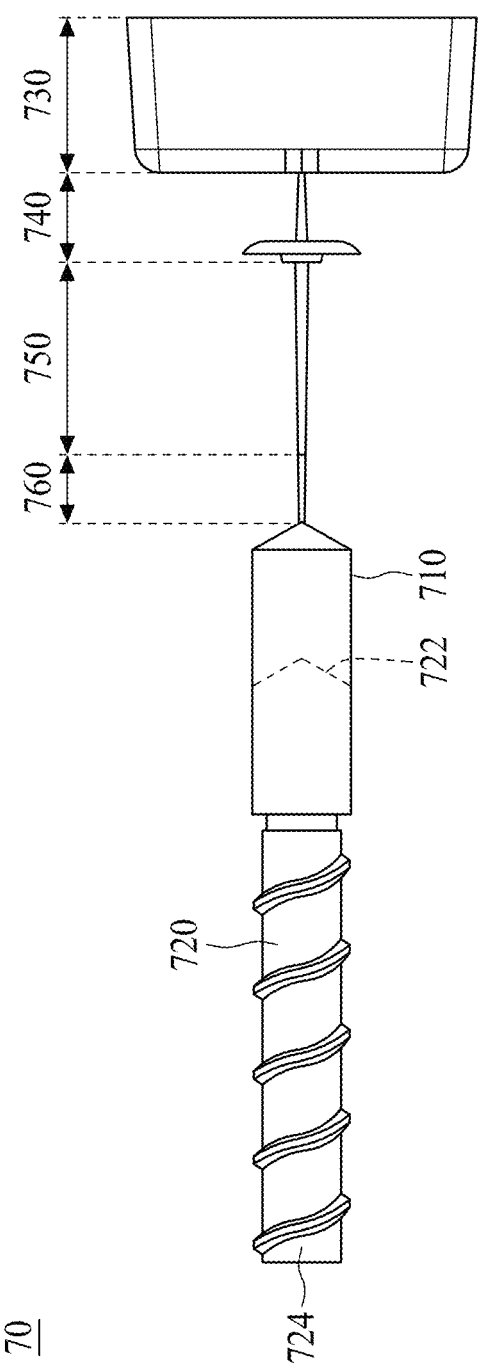
FIG. 4 is a schematic view of a simulating domain in accordance with some embodiments of the present disclosure.

FIG. 4 is a schematic view of a simulating domain 70 in accordance with some embodiments of the present disclosure. Referring to FIGS. 3 and 4, in some embodiments, the injection-molding simulation method 60 can begin at step S602 where the simulating domain 70 at least including a barrel 710 and a mold cavity 730 are specified. Referring to FIGS. 1 and 4, in some embodiments, the simulating domain 70 is obtained from a computer aided design (CAD) model, which is also used to design and develop the barrel 710 corresponding to the barrel 210 of the molding machine 20 and a product including the mold cavity 730 corresponding to the mold cavity 330, a first taped segment 740 corresponding to the runner 340, and a second taped segment 750 corresponding to the sprue 450. In some embodiments, the simulating domain 70 may further include a screw 720 corresponding to the screw 220 of the molding machine 20 and a nozzle 760 between the barrel 710 and the second taped segment 750 of the product.

Figure 5:
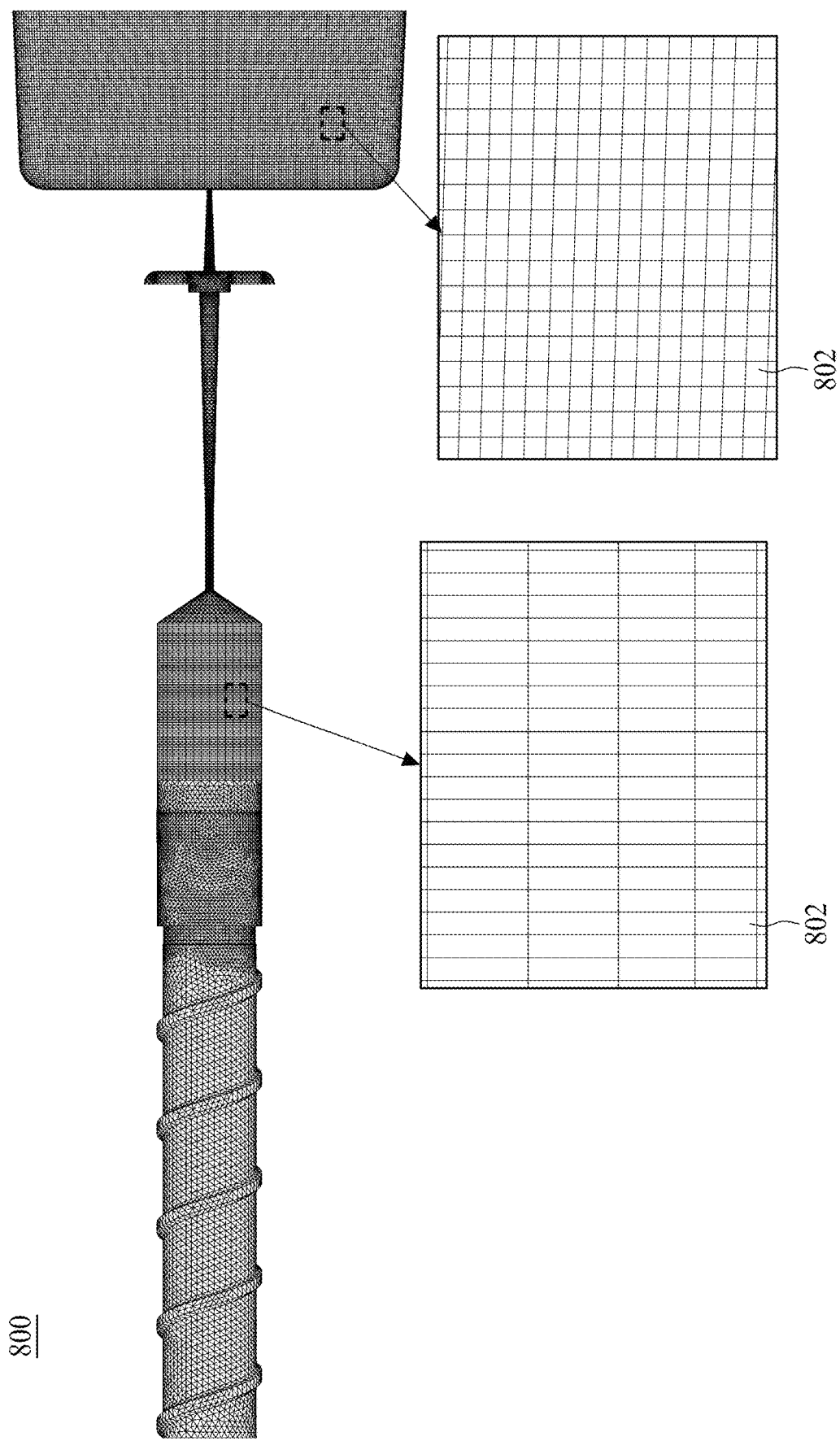
FIGS. 5 and 6 are schematic views of meshes in accordance with some embodiments of the present disclosure.
Figure 6:
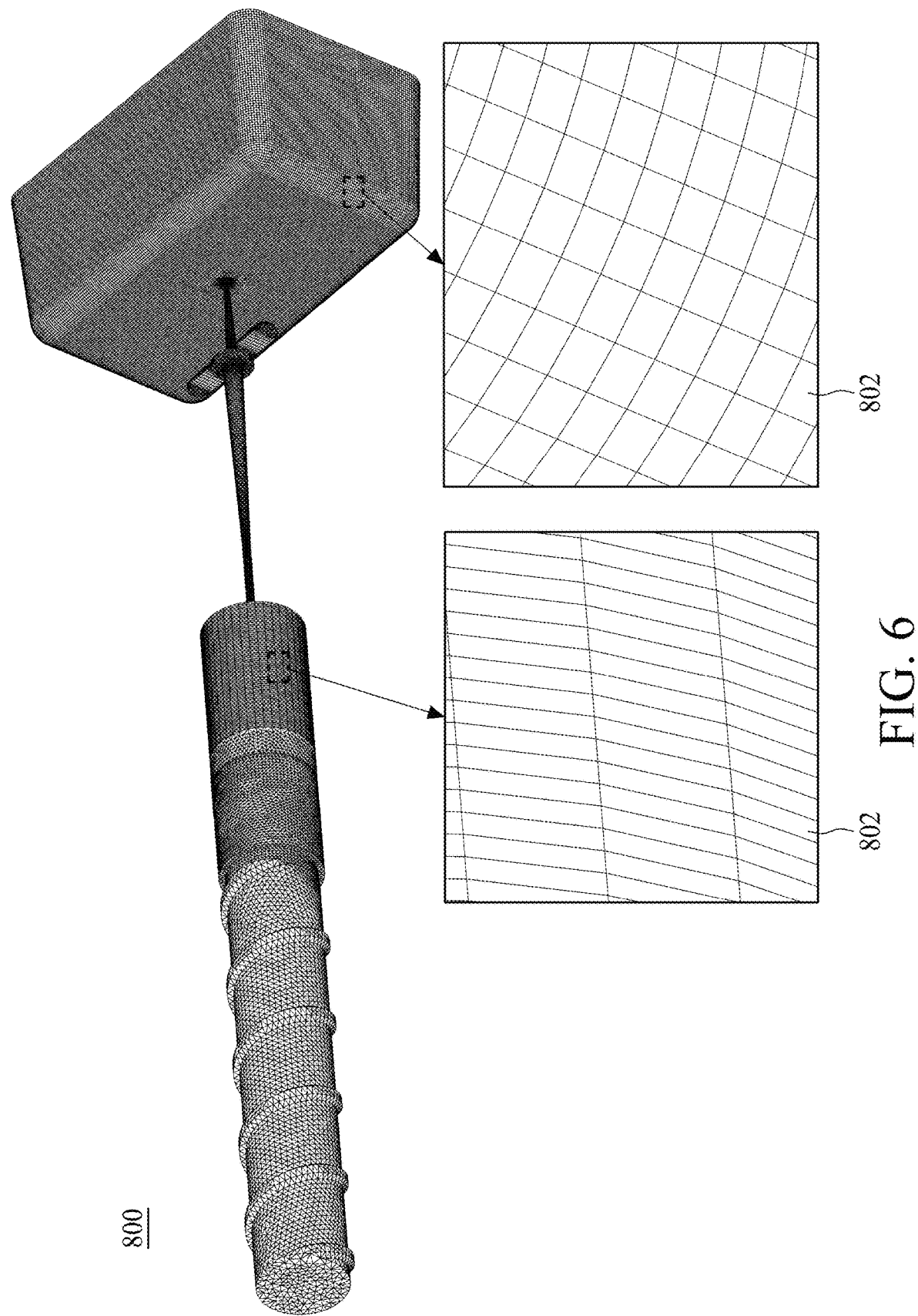

FIGS. 5 and 6 are schematic views of meshes 800 in accordance with some embodiments of the present disclosure. Referring to FIGS. 3, 5 and 6, in some embodiments, the injection-molding simulation method 60 can continue with step S604, in which a mesh 800 is created by dividing at least one part of the simulation domain 70 into at least one set of elements 802 before performing a numerical analysis, such as a finite element method (FEM), a finite difference method (FDM) or a finite volume method (FVM). The creation of the meshes 800 is a technique of modeling a fluid region and/or the product to be analyzed with at least one set of elements 802 in order to perform the subsequent numerical analysis. In some embodiments, the set of the elements 802 includes triangle mesh, rectangular mesh, hexahedral mesh or tetrahedral mesh.

Figure 7:
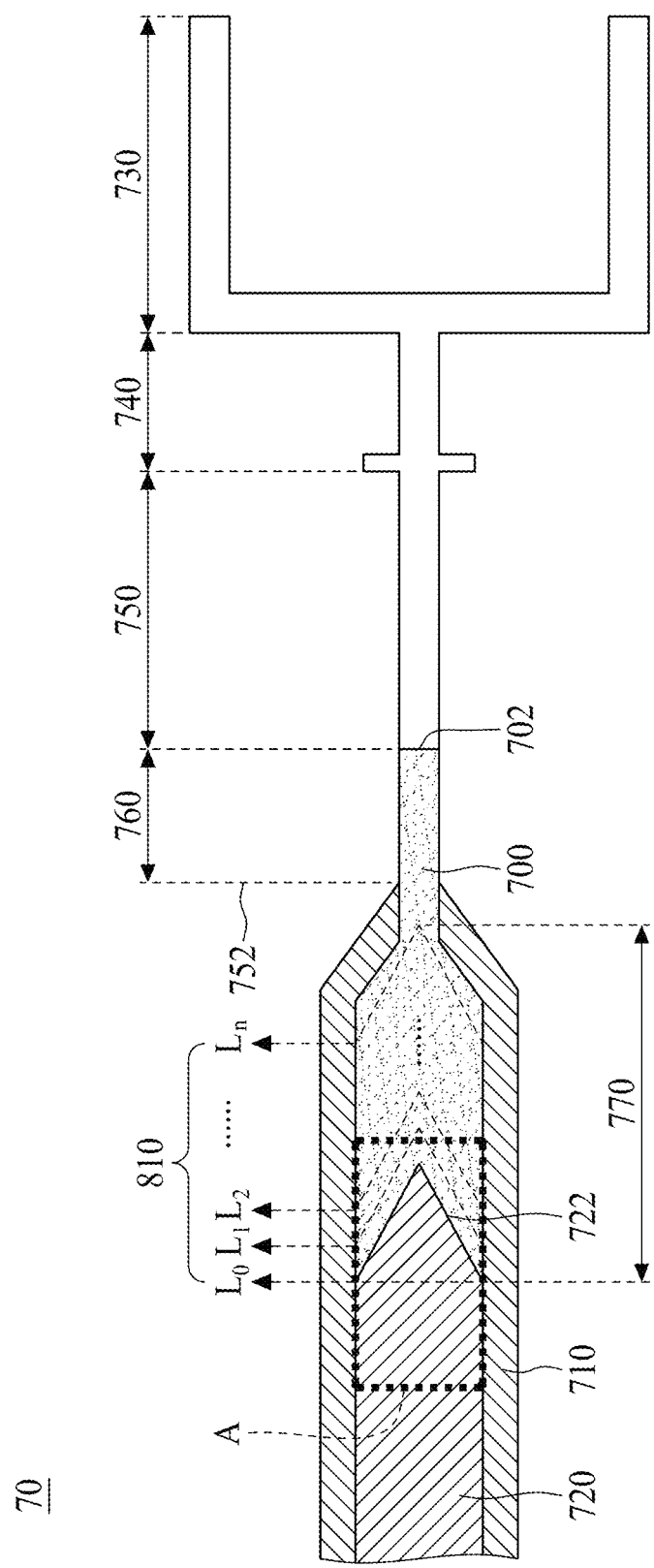
FIG. 7 is a cross-sectional view of the simulating domain in accordance with some embodiments of the present disclosure.
Figure 8A:
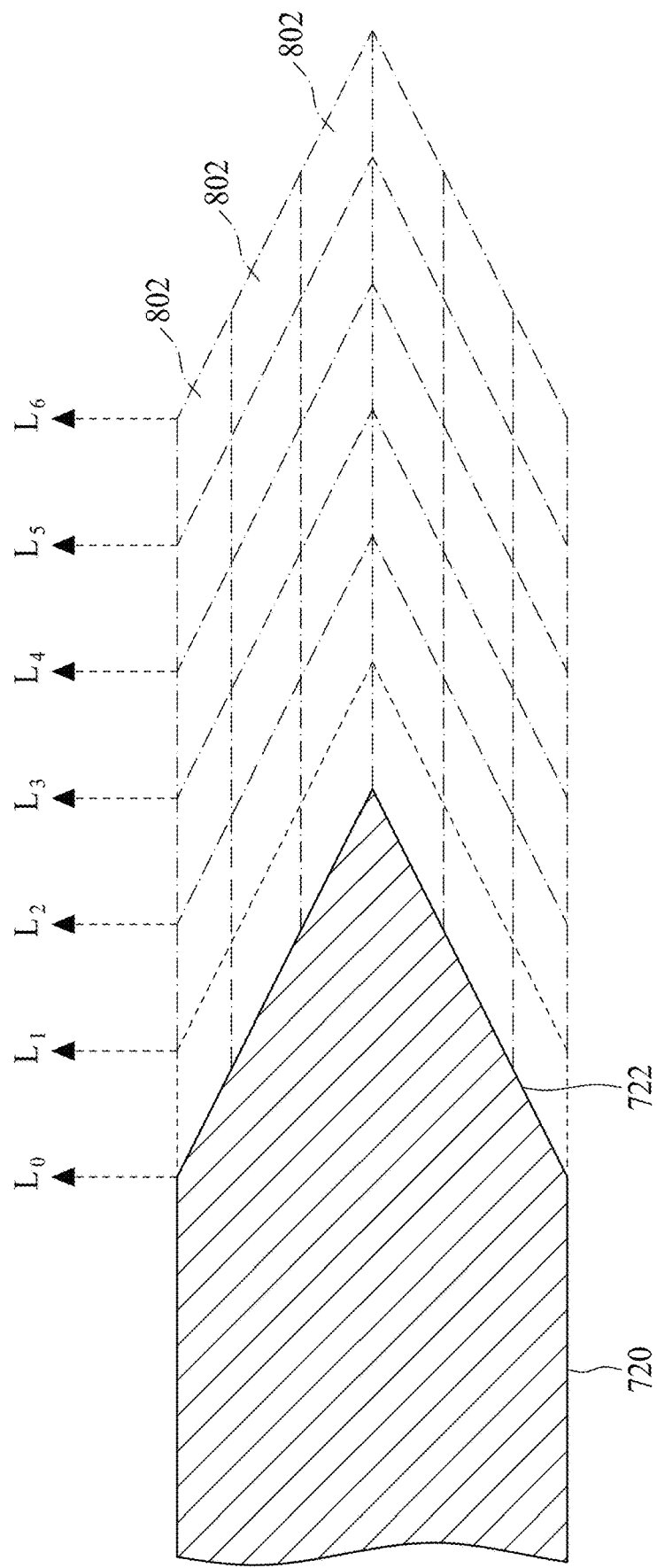
FIGS. 8A and 8B are close-up views of an area A of FIG. 7.
Figure 8B:
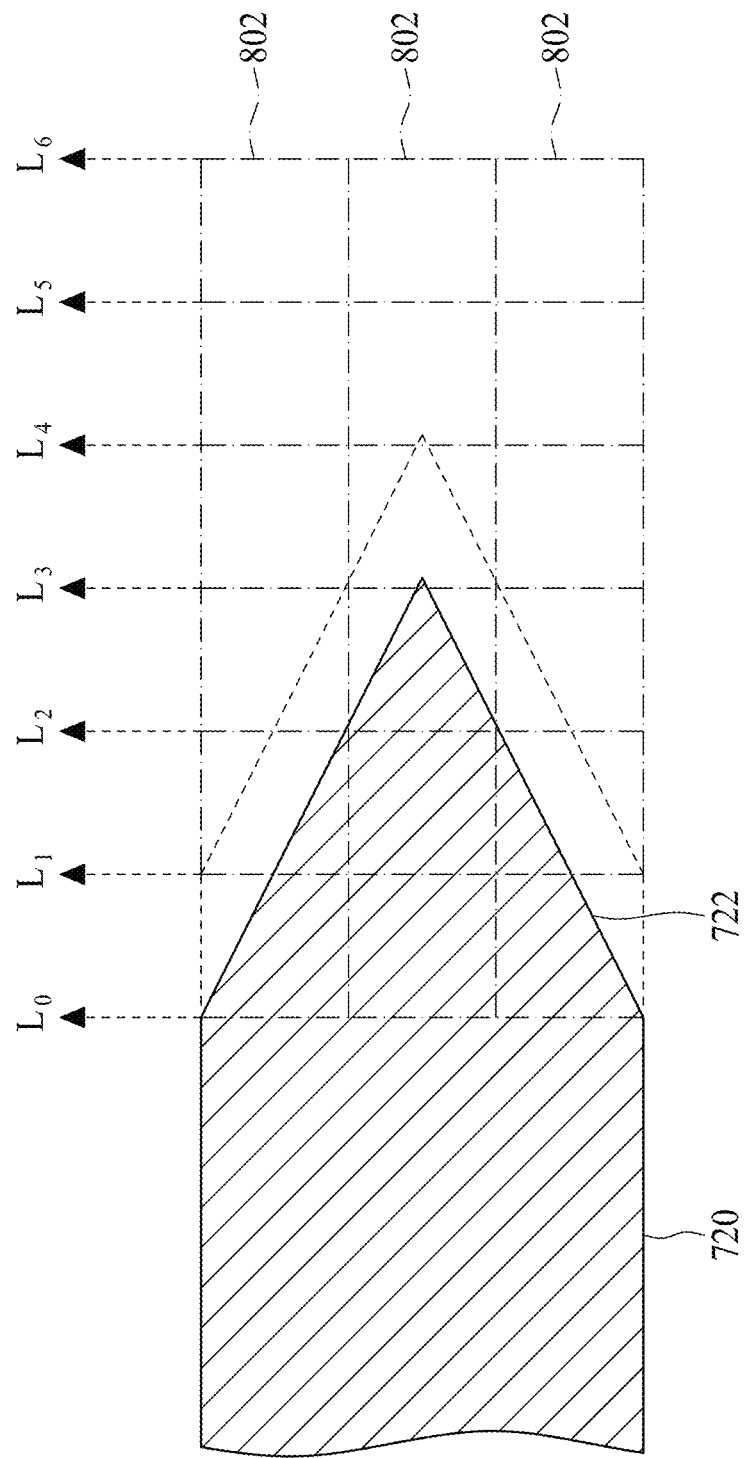
Figure 9A:
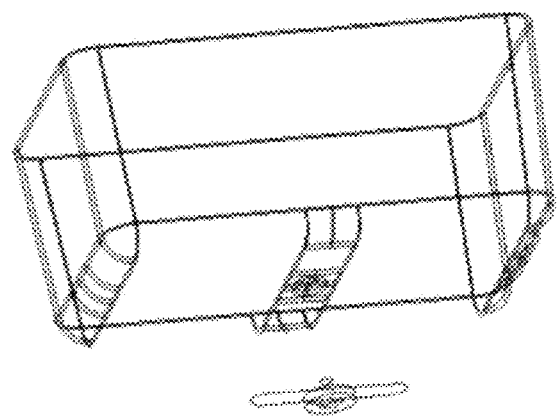
FIGS. 9A to 9D are schematic views showing a progression of the simulation method.
Figure 9A:
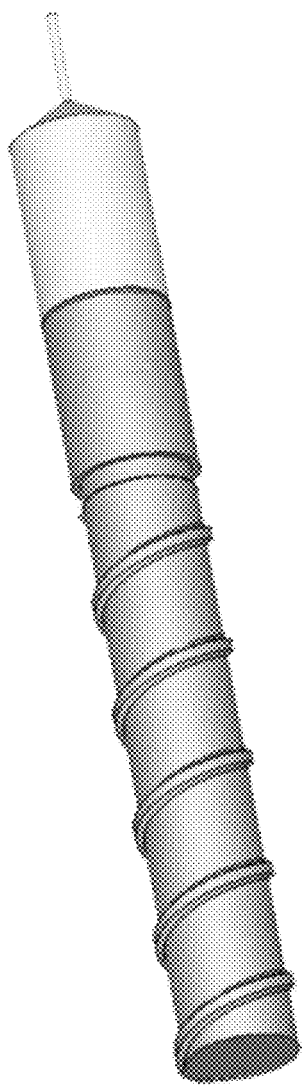
Figure 9B:
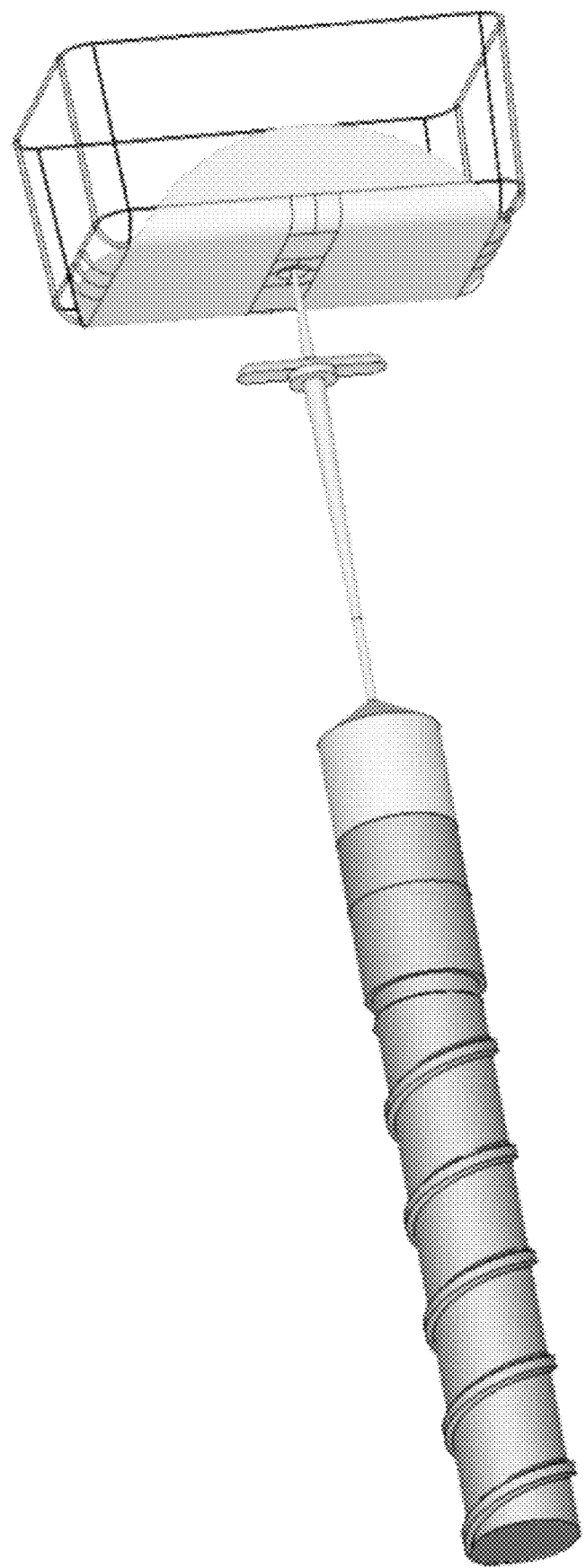
Figure 9C:
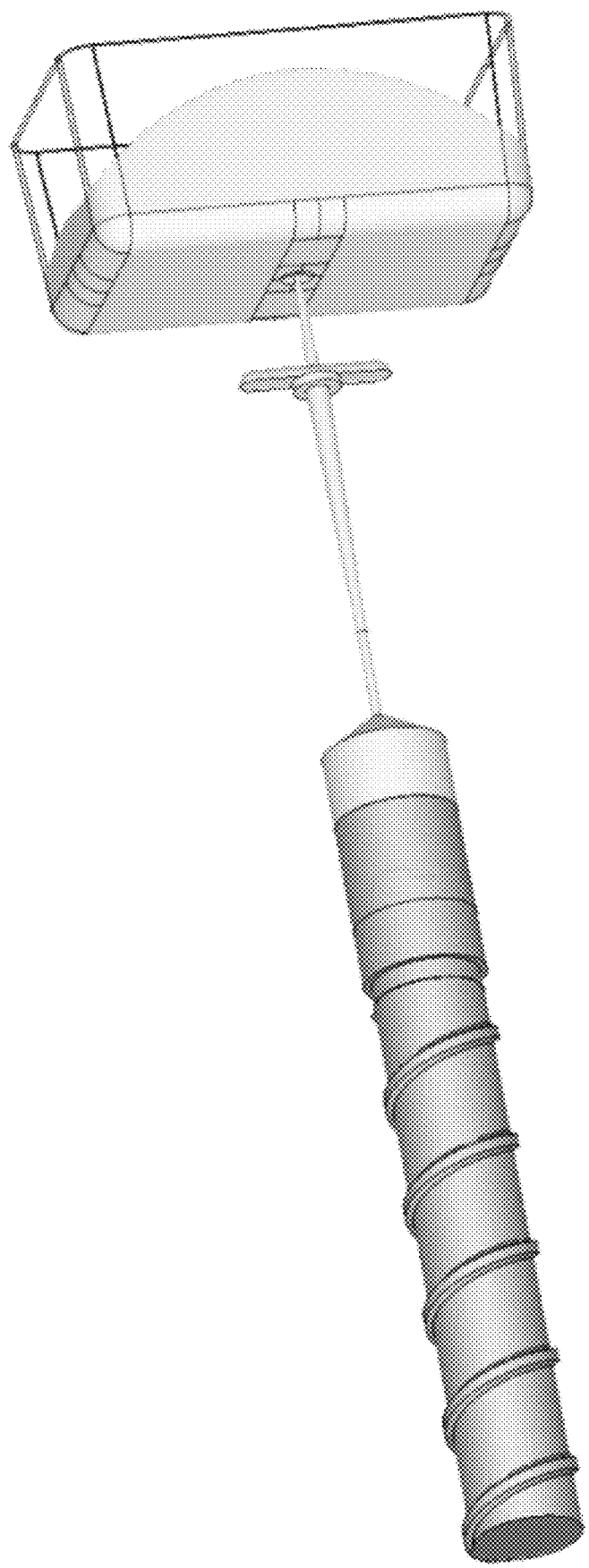
Figure 9D:
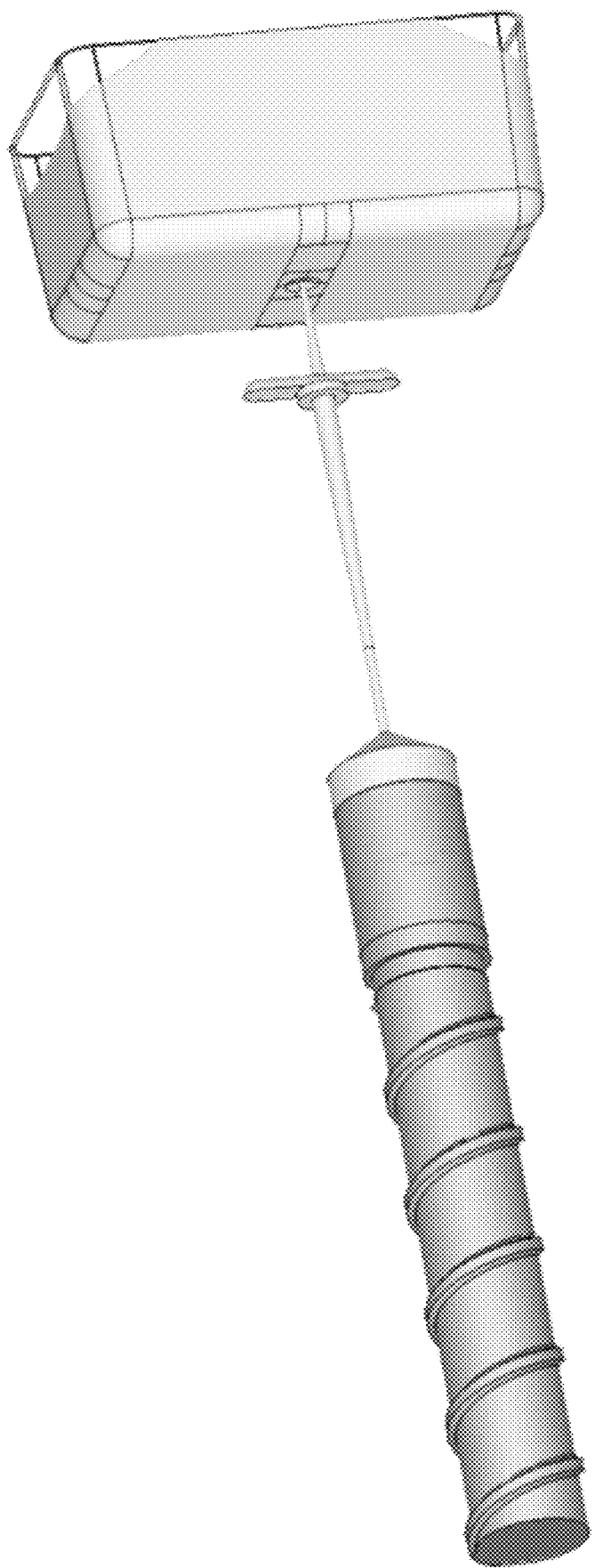

FIG. 7 is a cross-sectional view of the simulation domain 70 in accordance with some embodiments of the present disclosure. Referring to FIGS. 3 and 7, in some embodiments, the injection-molding simulation method 60 can continue with step S606, in which the boundary conditions of the mesh 800 are determined for the injection-molding simulation by taking into consideration the motion of the screw 720 in the barrel 710 to process the molding material 700 in the barrel 710. In some embodiments, the boundary conditions of the mesh 800 may be determined using a set of lines $L_0$ to $L_n$, which divide a screw movement zone 770 in the barrel 710 into a set of layers 810. In some embodiments, the lines $L_0$ to $L_n$ can have a contour corresponding to a front surface 722 of the screw 720, as shown in FIG. 8A. In some embodiments, the lines $L_0$ to $L_n$ can be straight lines and perpendicular to a movement direction of the screw 720, as shown in FIG. 8B. As shown in FIGS. 8A and 8B, the layer defined by two adjacent lines $L_0$ to $L_n$ can include a plurality of elements 802. In some embodiments, a distance between two adjacent lines $L_0$ to $L_n$ can be a constant, wherein n is positive integer. In other words, the layers defined by two adjacent lines $L_0$ to $L_n$ have a uniform area.

Referring again to FIG. 7, in some embodiments, a molding material 700, in a molten state, fills the nozzle 760 and a portion of the barrel 710 between the front surface 722 of the screw 720 and the nozzle 760. In some embodiments, a melt front 702 of the molding material 700 is at a boundary between the sprue 750 and the nozzle 760 before the performing of numerical analysis. The molding material 700 can be injected under pressure into the mold cavity 730 during a filling stage.

FIGS. 9A to 9D are schematic views showing a progression of the simulation method. Referring to FIGS. 3, 9A, 9B, 9C and 9D, in some embodiments, the injection-molding simulation method 60 continue with the step S608, in which the simulation is performed to simulate a first injection-molding process of the molding material 700 using the boundary conditions to generate the plurality of molding conditions, and the injection-molding simulation method 60 conclude with the step S610, in which the simulation is performed to simulate at least one second injection-molding process of the molding material 700 using the boundary conditions and the molding conditions. In some embodiments, the following equations (1) to (3) describe the physical change of the molding material 700 injected into the mold cavity 730 by the screw 720 in the barrel 710, including the change of mass, momentum and energy:

$$\frac{\partial \rho}{\partial t} + \nabla \cdot \rho u = 0 \tag{1}$$

$$\frac{\partial}{\partial t}(\rho u) + \nabla \cdot (\rho u u - \sigma) = \rho g \tag{2}$$

$$\rho C_P \left( \frac{\partial T}{\partial t} + u \cdot \nabla T \right) = \nabla \cdot (k \nabla T) + \eta \dot{\gamma}^2 \tag{3}$$

$$\sigma = -pI + \eta(\nabla u + \nabla u^T) \tag{4}$$

where ρ represents the density, t represents the time, u represents the velocity vector (flow velocity), g represents the gravitational force, η represents viscosity, T represents the temperature, k represents the thermal conductivity, $C_P$ represents the specific heat, and $\dot{\gamma}$ represents the shear rate. σ is the stress tensor that can be decomposed into an isotropic part and a non-isotropic part, as in equation (4); p and I represent the equilibrium pressure and the identity matrix, respectively.

According to the equation (1), which describes the movement of the molding material 700, an amount of the molding material 700 entering the molding cavity 730 is equal to an amount of the molding material 700 flowing out of the barrel 710 with respect to a linear motion of the screw 720 in the filling stage. In other words, the amount of the molding material 700 transferred into the mold cavity 730 by the screw 720 in the barrel 710 depends on the motion of the screw 720 with respect to the velocity field (u).

Figure 10:
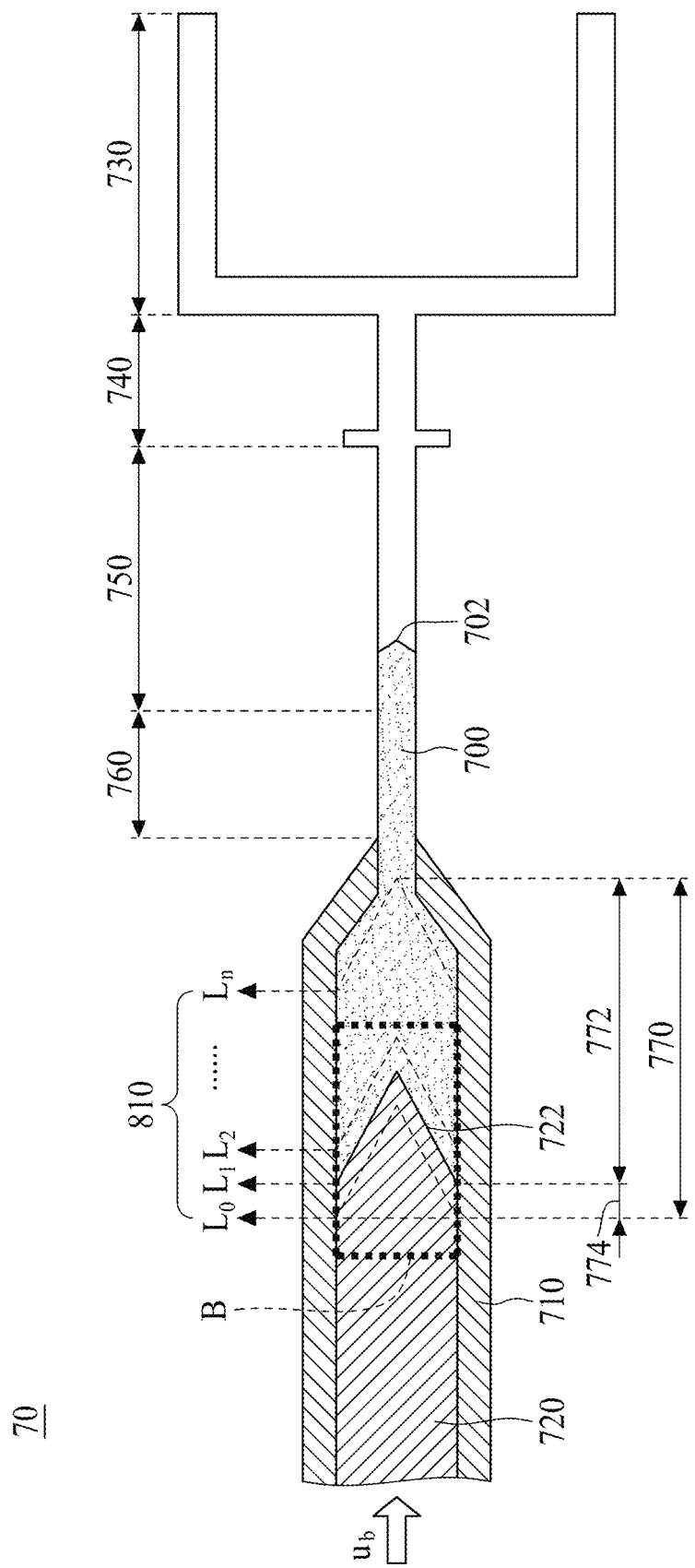
FIGS. 10 and 11 are cross-sectional views of the simulating domain showing movement of the screw across at least one layer.
Figure 11:
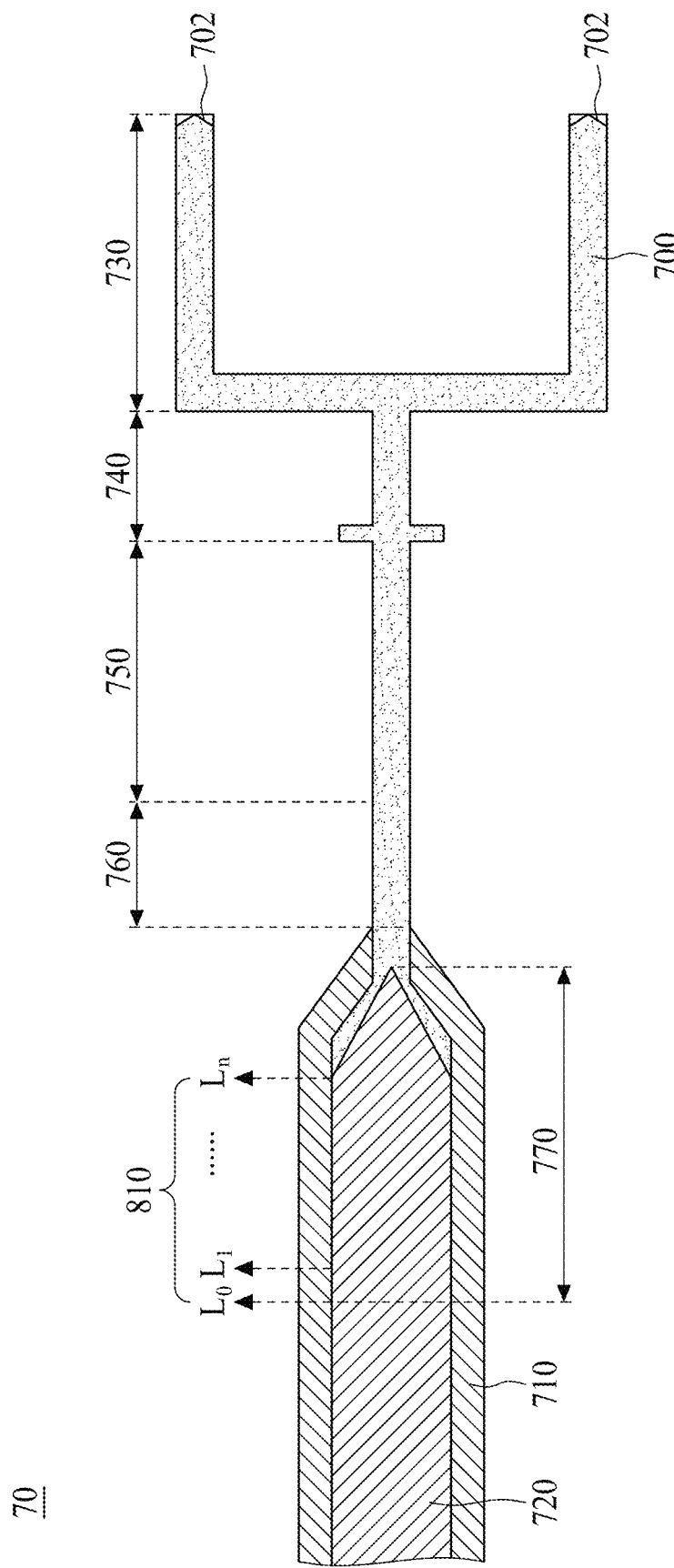

FIGS. 10 and 11 are cross-sectional views of the simulating domain 70 showing the screw 720 moving across at least one layer defined by the lines $L_0$ to $L_n$ during the filling stage. Referring to FIGS. 10 and 11, the screw 720 moves linearly toward the mold cavity 730 to push the molding material 700 in the barrel 710 to enter the mold cavity 730; thus the linear motion of the screw 720 can be used to calculate the position of the front surface 722 of the screw 720 in the barrel 710. In some embodiments, the linear movement of the screw 720 can be a uniform linear motion with constant velocity with respect to an injection time during the filling stage. In some embodiments, the speed $u_b$ of the screw 720 can be a non-uniform linear motion with variable velocity or non-zero acceleration constant.

Referring to FIGS. 7, 10 and 11, the simulation is performed by moving the screw 720 from the line $L_0$ to the line $L_n$ in time $t_n$ with at least one specific linear motion to simulate the injection-molding process of the molding material 700 injected into the mold cavity 730 by the screw 720 during the filling stage. In some embodiments, the front surface 722 of the screw 720 reaches the line $L_0$ at time $t_0$, the front surface 722 reaches the line $L_1$ at time $t_1$, and the front surface 722 reaches the line $L_n$ at time $t_n$, wherein the molding cavity 730 is almost filled with the molding material 700 as the front surface 722 of the screw 720 reaches the line $L_n$. As a result, the lines $L_0$ to $L_n$ can be used to indicate positions of the front surface 722 of the screw 720 in the barrel 710 with respect to time, and the positions of the front surface 722 of the screw 720 in the barrel 710 can be used as boundary conditions of the equations (1) to (3). In should be noted that when the lines $L_0$ to $L_n$ have the contour corresponding to the front surface 722 of the screw 720, the front surface 722 of the screw 720 can overlap the line $L_0$ at time $t_0$, the front surface 722 can overlap the line $L_1$ at time $t_1$, and the front surface 722 can overlap the line $L_n$ at time $t_n$.

Referring to FIG. 10, when the screw 720 moves linearly toward the mold cavity 730 to push the molding material 700 in the barrel 710 to enter the mold cavity 730, the screw movement zone 770 is divided into a melt phase region 772 filled with the molding material 700 and a screw phase region 774 occupied by the screw 720. In the screw phase region 774, the velocity vector is zero (i.e., u=0), and the pressure is also zero (i.e., p=0).

Figure 12:
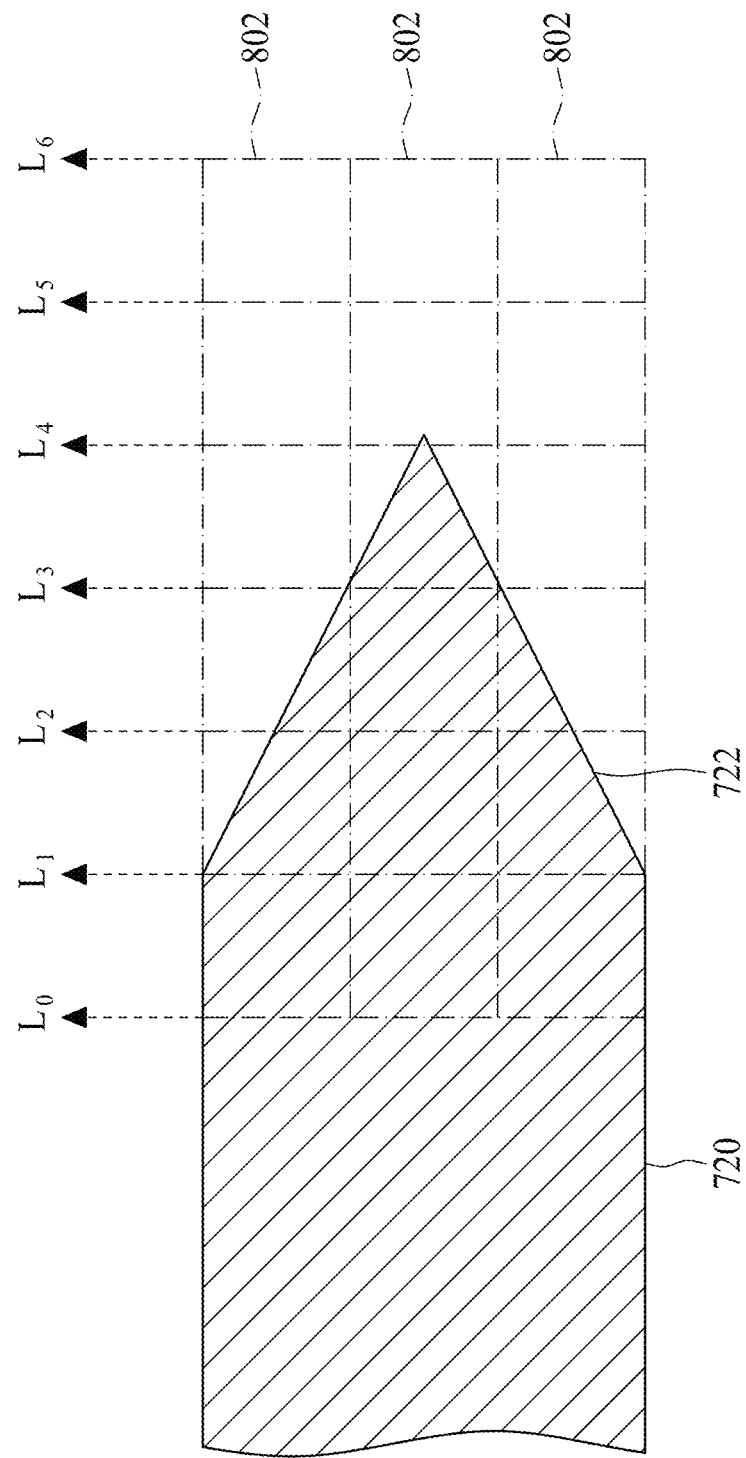
FIG. 12 is close-up view of an area B of FIG. 10.

FIG. 12 is a close-up view of an area B of FIG. 10. Referring to FIG. 12, which shows the lines $L_0$ to $L_6$ being perpendicular to the movement direction of the screw 720, the screw 720 fully occupies the layer between the line $L_0$ and line $L_1$, and partially occupies the layers between lines $L_1$ to $L_5$. The density and viscosity of the element 802 partially occupied by the screw 720 can thus be expressed as below.

$$\rho_{mixed} = V_{screw} \cdot \rho_{screw} + V_{melt} \cdot \rho_{melt} \tag{5}$$

$$\eta_{mixed} = V_{screw} \cdot \eta_{screw} + V_{melt} \cdot \eta_{melt} \tag{6}$$

Where $\rho_{mixed}$ mixed represents the density of the element 802 partially occupied by the screw 720, $\rho_{screw}$ represents the density of the screw 720 in the element 802, $\rho_{melt}$ represents the density of the molding material 700 in the element 802, $V_{screw}$ represents the volume of the screw 720 in the element 802, $V_{melt}$ represents the volume of the molding material 700 in the element 802, $\eta_{mixed}$ represents the viscosity in the element 802, $\eta_{screw}$ represents the viscosity of the screw 720 in the element 802, and $\eta_{melt}$ represents the viscosity of the molding material 700 in the element 802.

The equations (1) to (3), which describe the physical change of the molding material 700 during the filling stage, can thus be expressed as below by assuming that a linear motion of the screw 720 across the layer between the lines $L_0$ to $L_n$ is $u_b$.

$$\frac{d}{dt}\int_{\Delta\Omega(t)}\rho dV + \int_{S(t)}(u-u_b)\cdot n dS = 0 \qquad (7)$$

$$\frac{d}{dt}\left(\int_{\Delta\Omega(t)}\rho u dV\right) + \int_{S(t)}\rho u(u-u_b)\cdot n dS - \int_{S(t)}\eta\nabla u \cdot n dS = \qquad (8)$$
$$\int_{\Delta\Omega(t)}(-\nabla p + \rho g)dV + \int_{\Delta\Omega(t)}\nabla\cdot(\eta\nabla u^T)dV$$

$$\frac{d}{dt}\left(\int_{\Omega(t)}\rho C_p T dV\right) + \int_{S(t)}\rho C_p T(u-u_b)\cdot n dS = \qquad (9)$$
$$\int_{S(t)}k\nabla T\cdot n dS + \int_{\Omega(t)}(\tau:\nabla u)dV + \frac{\partial}{\partial t}\int_{\Omega(t)}\frac{Dp}{Dt}dV$$

where dV represents volume of the molding material 700 and dS represents the area of the layer.

By the equations (7) to (9), the molding conditions including a temperature distribution of the molding material 700, a pressure in the barrel 710, and a flow velocity of the molding material 700 can be obtained. Therefore, the position the melt front 702 of the molding material 700 can be calculated.

In some embodiments, the equation (7), which describes the physical change of the molding material 700 in integral form, can be converted into an algebraic expression as below:

$$\Sigma_{i=1-n}\rho_i^t \cdot V_i^t = \Sigma_{i=1-n}\rho_i^{t+dt}\cdot(V_i^{t+dt}+(u_b\cdot n_i ds_i)dt) \qquad (10)$$

where $\rho^t$ and $\rho^{t+dt}$ represent the densities of the molding material 700 at different injection times, $V^t$ and $V^{t+dt}$ represent the volumes of the molding material 700 at different injection times, dt represents an increment of time, $u_b$ represents the linear movement of the screw 720, and $ds_i$ represents the area of the layer.

After the first injection-molding process is completely simulated and the molding conditions are obtained, the melt front 702 of the molding material 700 can be determined. The at least one second injection-molding process is then simulated by moving the front surface 722 of the screw 720 from the line $L_1$ to the line $L_n$ using boundary conditions and the molding conductions obtained in the previous simulation to generate the other molding conditions.

Figure 13:
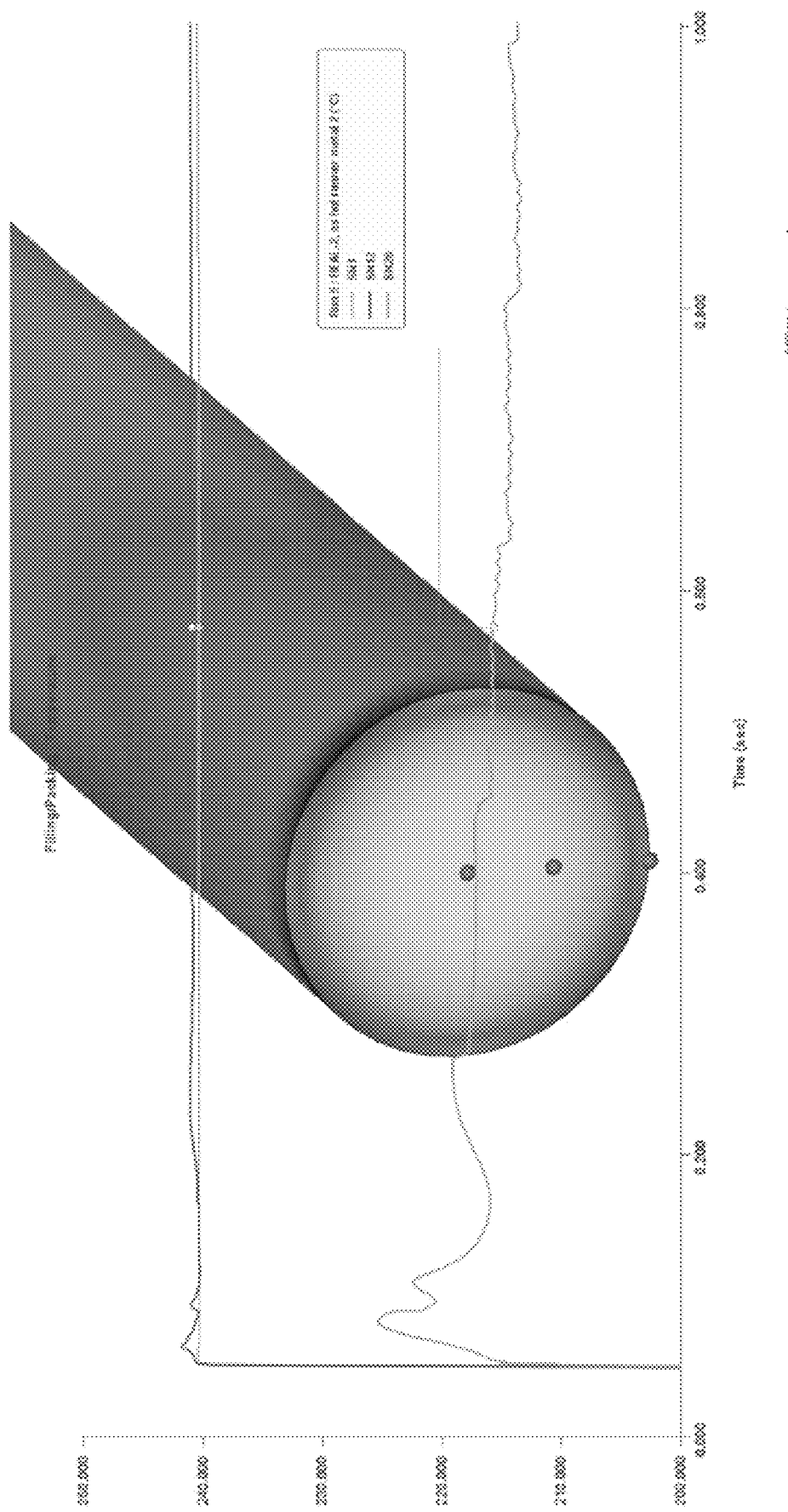
FIG. 13 shows a surface map of temperatures of a molding material at an entrance face of a sprue in the simulating domain.
Figure 14:
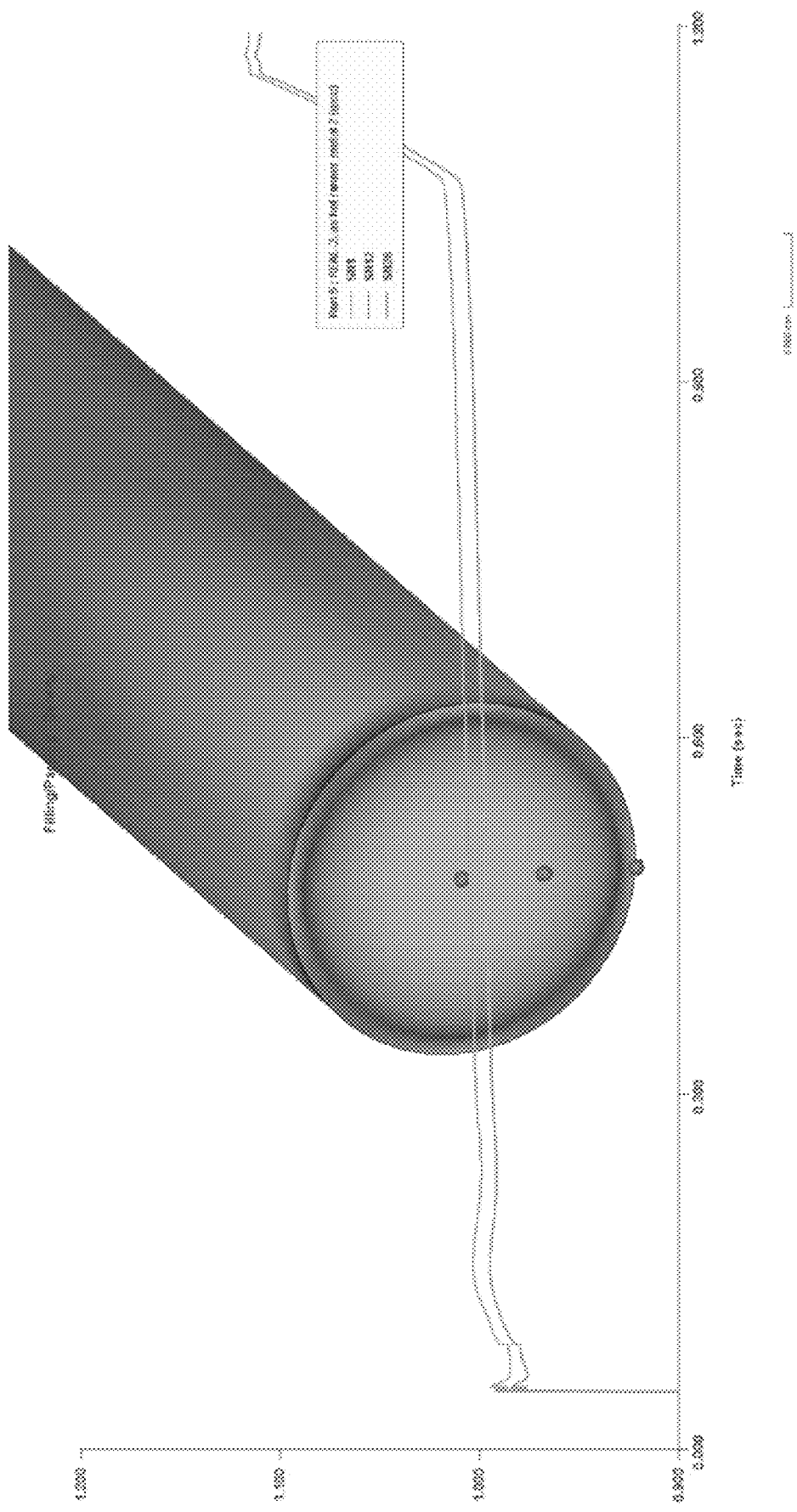
FIG. 14 shows a surface map of densities of the molding material at the entrance face of the sprue in the simulating domain.

The molding conditions of the molding material 700 in the simulating domain 70, such as the temperature distribution across the molding material 700 shown in FIG. 13 and density distribution across the molding material 700 shown in FIG. 14, can be simulated by using the equations (7) to (9) mentioned above, which can be solved numerically by setting the boundary conditions of the mesh 800 while taking into consideration the at least one motion of the screw 720 in the barrel 710 and performing the numerical analysis on the simulation molding phenomena of the molding material 700 in the simulating domain 70. The actual molding can then be conducted in the injection-molding machine 20 as shown in FIG. 1.

Figure 15:
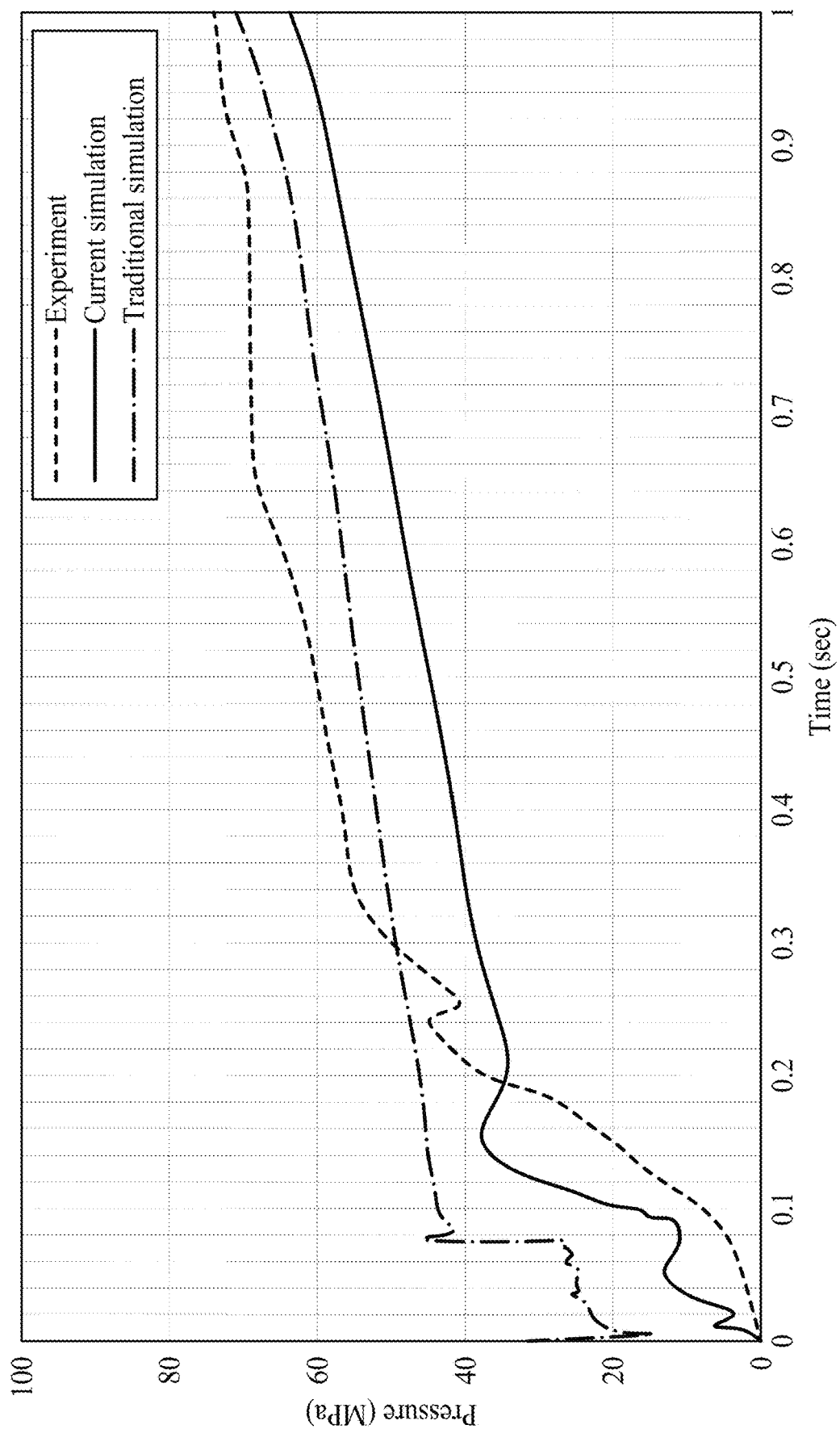
FIG. 15 is a chart showing an experiment waveform, a traditional simulation waveform and a current simulation waveform of a pressure in the sprue.

FIG. 15 shows an experiment waveform, a traditional simulation waveform and a current simulation waveform of the pressure of the sprue. As can be seen in FIG. 13, the current simulation waveform substantially fits the experiment waveform; therefore, the method of the present invention is more suitable to simulate molding phenomena of the molding material 700 in the simulating domain 70.

In conclusion, the present disclosure sets the boundary conditions of the mesh 800 by taking into consideration the at least one motion of the screw 720 in the barrel 710 and performing numerical analysis on the simulation molding phenomena of the molding material 700 in the simulating domain 70. As a result, the method of the present disclosure can accurately predict reality-compatible results of an injection-molding process.

One aspect of the present disclosure provides a computer-implemented simulation method for use in a molding process by a computer process. The method includes steps of specifying a simulating domain comprising a mold cavity and a barrel of an injection machine, wherein the barrel is configured to connected to the mold cavity; creating at least one mesh by dividing at least part of the simulating domain; specifying boundary conditions of the mesh by taking into consideration at least one motion of a screw in the barrel to process a molding material in the barrel; and simulating a first injection-molding process of the molding material using the boundary conditions to generate a plurality of molding conditions.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods and steps.

What is claimed is:

1. A method for operating an injection-molding apparatus, wherein the injection-molding apparatus comprises:
   a mold defining a mold cavity; and
   an injection machine including a barrel and a screw being movable in the barrel, the barrel being configured to connect to the mold cavity and including a screw movement zone in which the screw moves to inject a molding material into the mold cavity,
   the method comprising:
   specifying, via computer-assisted engineering simulation software, a simulating domain comprising the mold cavity, the barrel, and the screw;
   creating, via computer-assisted engineering simulation software, at least one mesh by dividing the mold cavity and the screw movement zone into mesh components;
   determining, via computer-assisted engineering simulation software, boundary conditions of the mesh by taking into consideration at least one motion of the screw in the barrel to process the molding material in the barrel;

simulating, via computer-assisted engineering simulation software, a first injection-molding process to force the molding material out of the barrel and into the mold cavity by moving the screw using the boundary conditions, wherein the simulation generates a plurality of molding conditions indicating phenomena of the molding material transferred from the barrel and into the mold cavity from a calculation using factors in a part of the mesh components associated with the screw movement zone, the factors including a volume of the molding material and a volume of the screw in the part of the mesh components, thereby accurately predicting a melt front of the molding material in the mold cavity; and adjusting operations of the injection-molding apparatus for performing an actual molding by using the generated plurality of molding conditions.

2. The method of claim 1, further comprising simulating, via computer-assisted engineering simulation software, at least one second injection-molding process of the molding material using the boundary conditions and the plurality of molding conditions.

3. The method of claim 1, wherein the plurality of molding conditions comprise a temperature distribution across the molding material, a pressure in the barrel, and a flow rate of the molding material.

4. The method of claim 1, wherein the boundary conditions of the mesh are determined using a plurality of divisions that define a desired movement of the screw in the screw movement zone with respect to time.

5. The method claim 4, wherein at least one of the divisions includes plural ones of the mesh components.

6. The method of claim 5, wherein a density and a viscosity of the mesh component partially occupied by the screw and partially filled with the molding material are described by equations as shown below:

$$\rho_{mixed} = V_{screw} \cdot \rho_{screw} + V_{melt} \cdot \rho_{melt};\text{ and}$$

$$\eta_{mixed} = V_{screw} \cdot \eta_{screw} + V_{melt} \cdot \eta_{melt},$$

Where $\rho_{mixed}$ represents the density of the mesh component, $\rho_{screw}$ represents the density of the screw in the mesh component, $\rho_{melt}$ represents the density of the molding material in the mesh component, $V_{screw}$ represents the volume of the screw in the mesh component, $V_{melt}$ represents the volume of the molding material in the mesh component, $\eta_{mixed}$ represents the viscosity in the mesh component, $\eta_{screw}$ represents the viscosity of the screw in the mesh component, and $\eta_{melt}$ represents the viscosity of the molding material in the mesh component.

7. The method of claim 1, wherein an amount of the molding material injected into the mold cavity by the screw in the barrel is described by an equation as shown below:

$$\sum_{i=1\sim n} \rho_i^t \cdot V_i^t = \sum_{i=1\sim n} \rho_i^{t+dt} \cdot (V_i^{t+dt} + (u_b \cdot n_i ds_i)dt),$$

where $\rho^t$ and $\rho^{t+dt}$ represent the densities of the molding material at different injection times, $V^t$ and $V^{t+dt}$ represent the volumes of the molding material at different injection times, dt represents an increment of time, $u_b$ represents the speed of the screw, and $d_{si}$ represents an area.

8. The method of claim 1, wherein the at least one motion of the screw is at least one linear motion of the screw in the barrel while the molding material is injected into the mold cavity.

9. The method of claim 1, wherein the at least one motion of the screw is used for determining a position of a front surface of the screw in the barrel.

* * * * *